May 28, 1946.                 R. GORDON                    2,401,149
                         WIRE STRIPPING MACHINE
                         Filed Oct. 27, 1944

INVENTOR.
REUBEN GORDON
BY
ATTORNEY.

Patented May 28, 1946

2,401,149

UNITED STATES PATENT OFFICE 2,401,149

WIRE STRIPPING MACHINE

Reuben Gordon, Seattle, Wash.; now by judicial change of name Robert Gordon

Application October 27, 1944, Serial No. 560,689

7 Claims. (Cl. 81—9.51)

This invention relates to new and useful improvements in a wire stripping machine.

More specifically, the invention proposes the construction of a wire stripping machine which is foot operated and which is capable of cutting through insulation and the end of a piece of wire with a minimum of effort on the part of the operator regardless of the thickness or toughness of the insulation applied to the wire.

Another object of the invention proposes the construction of a wire stripping machine characterized by a bracket having spaced arms upon which a driving plate is rotatively mounted to be driven by a vertical rack adapted to be pulled downwards by a foot operated lever.

Another object of the invention proposes the provision of a driven plate rotatively mounted on the other of the arms and carrying a plurality of cutting knives radially slidably mounted thereon and which are adapted to move inwards to cut the insulation of a piece of wire under influence of the rotative action of the driven plate.

Still another object of the invention proposes the provision of a relationship between the driven plate and the driving plate for causing the driven plate to rotate with the driving plate upon completion of the movement of the cutting blade to cut completely around the insulation while the wire is being held stationary.

Still another object of the invention proposes that the piece of wire, after having the insulation cut by the blades, be pulled from the stripping machine to strip the freed piece of insulation material from the end of the wire.

It is another object of this invention to construct a wire stripping machine which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
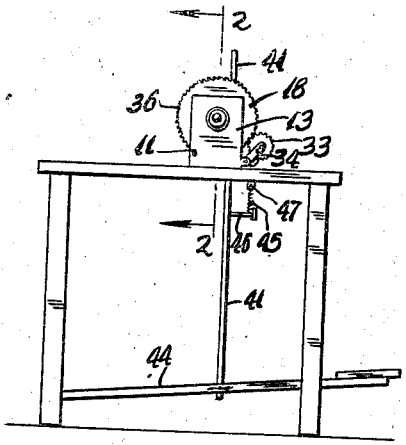
Fig. 1 is a side elevational view of a wire stripping machine constructed in accordance with this invention.
Figure 3:
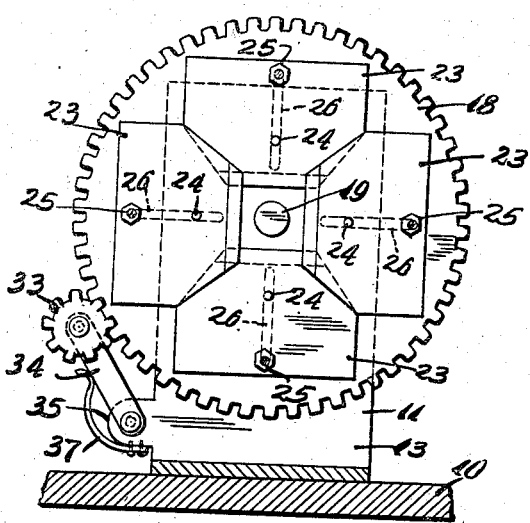
Fig. 3 is a vertical sectional view taken on the line 3—3 of Fig. 2.
Figure 4:
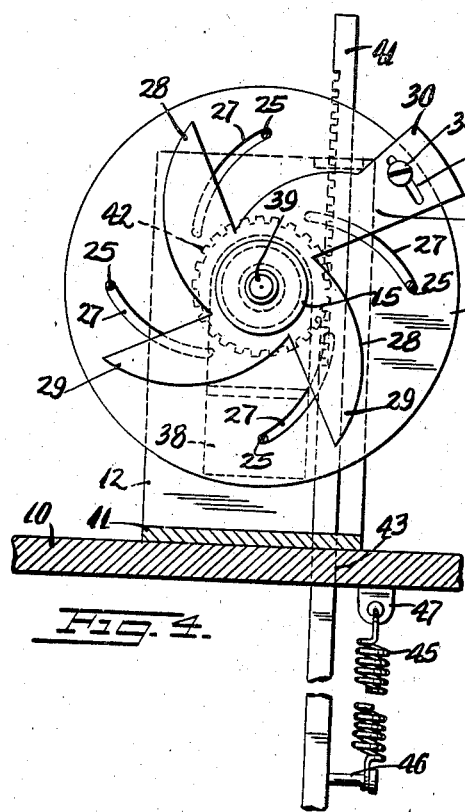
Fig. 4 is a vertical sectional view taken on the line 4—4 of Fig. 2.
Figure 2:
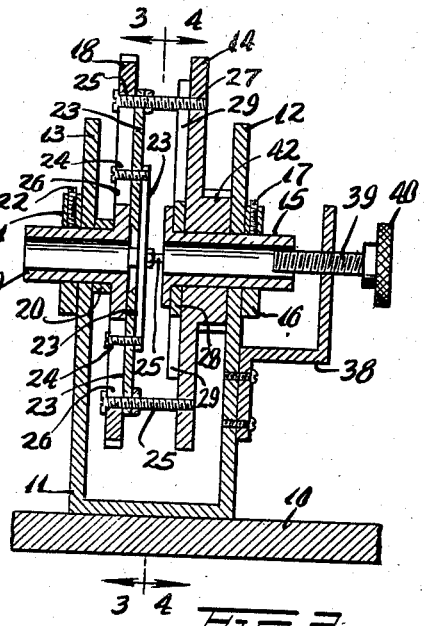
Fig. 2 is a partial vertical sectional view taken on the line 2—2 of Fig. 1.

The wire stripping machine, according to this invention, includes a table 10 upon which a U-shaped bracket 11 is fixedly mounted. The U-shaped bracket 11 includes spaced upwardly extending arms 12 and 13.

A driving plate 14 is rotatively mounted on one of the arms of the U-shaped bracket 11. The driving plate 14 is preferably mounted upon the arm 12. The driving plate 14 is rotatively supported on a tube 15 extended through the arm 12 and retained in a fixed position by means of a collar 16 which bears against the outer face of the arm 12. A set screw 17 holds the collar 16 in a fixed desired adjusted position on the tube 15.

A driven plate 18 is rotatively mounted on the other arm 13 of the U-shaped bracket 11 coaxially of the driving plate 14. The driven plate 18 is formed with a tubular projection 19 which extends through a collar 20 and through an opening formed in the arm 13. The collar 20 maintains the driven plate 18 in a desired rotative spaced position with relation to the arm 13. A second collar 21 is mounted upon the extended end of the tubular projection 19 and is retained in a fixed position by a set screw 22.

A plurality of cutting blades 23 are radially slidably mounted on the driven plate 18. The blades 23 are radially slidably supported by means of pins 24 and 25 which project through slots 26 formed in the driven plate 18. These pins 24 and 25 which engage the slots 26 permit inward and outward radial movement of the blades 23. The cutting blades 23 have their cutting edges disposed adjacent each other to engage the insulation in a complete circle about the wire.

The pins 25 have greatly extended ends which engage spiral-like cam slots 27 formed in the driving plate 14. As the driving plate 14 is turned these spiral-like cam slots 27 will move the pins 24 inwards similarly moving the cutting blades 23 along the length of the slots 26. Thus movement of the driving plate 14 will urge the cutting blades 23 inwards.

A stop plate 28 is provided in connection with the driving plate 14 for cutting off portions of the cam slots 27 limiting movement of the pins 24 and for locking the driven plate 18 to the driving plate 14 upon complete inward movement of the cutting blades 23 to cause the driven plate 18 to rotate with the driving plate 14. This stop plate 28 is rotatively supported on the tubular member 15 adjacent the driven plate 18 and has radial projecting portions 29 one for each of the cam slots 27. In certain turned positions of the stop plate 28 the pins 25 will strike the projecting portions 29 preventing further movement along the length of the cam slots 27 to cause further rotations of the driving plate 14 to rotate the driven plate 18. An adjustable means is provided for holding the stop plate 28 in various adjusted positions relative to the driven plate 14. This means comprises an extension 30 on one of the radially extending portions 29 of the stop plate and on which extension is formed an arcuate slot 31. This arcuate slot 31 is arranged concentric with the turning point of the stop plate 28. A screw 32 passes through the arcuate slot 31 and threadedly engages a complementary opening in the driving plate 14 for holding the stop-plate 28 in various adjusted positions relative to the inner ends of the spiral-like cam slots 27.

Means is provided in connection with the driven plate 18 for holding the driven plate against free rotation and to prevent it from turning until such time as the pins 25 strike the radial projecting portions 29 of the stop plate 28. This means comprises a gear 33 which is rotatively supported on the end of an arm 34 which is pivotally supported on a lug 35 which projects from the arm 13 of the U-shaped bracket 11. The gear 33 meshes with complementary gear teeth 36 formed on the periphery of the driven plate 18. Resilient means is provided for pivoting the arm 34 to cause the gear 33 to bear rigidly against the periphery of the driven plate 18. This means comprises a leaf spring 37 having one end fixedly attached to the lug 35 and its other end bearing against the arm 34.

The wire to be stripped is adapted to be inserted through the tubular projection 19 of the driven plate 18 and into the tubular member 15 which rotatably supports the driving plate 14. This will bring the wire into a position between the inner ends of the cutting plates 23. Means is provided in the form of an adjustable stop for controlling the extent to which the wire to be stripped may be inserted into the passages 15 and 19. This means comprises a support 38 mounted on the outer face of the arm 12 of the U-shaped bracket 11 and having an upwardly extended portion projecting across the outer end of the tubular member 15. A screw 39 is threadedly extended through the upwardly extended portion of the support 38 and has its free end freely projected into the outer end of the tubular member 15. A knob 40 is mounted on the outer end of the screw 39 and provides a grip for turning the screw to adjust its position within the end of the tubular member 15. It will be greatly understood that the end of the wire projected into the passages of the tubular members 15 and 19 will strike the inner end of the screw 39 and limit further inward projection of the wire into the passage. Adjusting the position of the screw will control the degree to which the end of the wire may be projected into the passages and the amount of insulation that will be stripped from the end by blades 23.

Means is provided for turning the driving blade 14 in one direction or the other. This means comprises a vertical slidably mounted rack 41 which meshes with a complementary gear portion 42 formed on the side of the driving plate 14. The bottom end of the rack 41 extends through an opening 43 formed in the bottom of the U-shaped bracket 11 and in the top of the table 10. At its bottom end the rack 41 is pivotally connected to an intermediate area of a horizontal pivotally mounted foot lever 44. The foot lever 44 is adapted to be depressed by the operator's foot for pulling the rack 41 downwards to rotate the driving plate 14.

Resilient means is provided for returning the rack 44 to its starting position to turn the driving plate 14 back to its starting position. This means comprises a contraction spring 45 which operates between a pin 46 extending from a portion of the rack 41 and a lug 47 mounted on the bottom face of the top of the table 10. The movement of the rack 41 downwardly through the medium of the foot lever 44 will expand and load the spring 45 to supply the necessary power to move the rack 41 upwards when the foot lever 44 is released.

The operation of the device is as follows:

The screw 39 is properly adjusted and the end of the wire from which the insulation is to be removed is inserted into the passages of the tubular members 15 and 19 until it strikes the inner end of the screw 39. The foot lever 44 is then depressed turning the driving plate 14 to move the cutting blades 23 inwards on the driven plate 18 to cut into the insulation of the wire. Rotations of the driving plate 14 are continued until the pins 24 strike the radially projecting portions 29 of the stop plate 28. This will lock the driven plate 18 to the driving plate 14 causing it to rotate therewith. The tensioning gear 33 functions to hold the driven plate 18 against rotating until such time as the pins 25 strike the projection 29. When the driven plate 18 rotates the cutting blades 23 will rotate therewith and cut completely around the insulation of the wire. With the foot lever 44 depressed the wire is pulled out of its position in the tubular members 15 and 19 causing the cut end of the insulation to be stripped from the end of the wire. After the wire is pulled out the foot lever 44 is released and the spring 45 will return the parts to their starting position. The stripped piece of insulation may then be removed from the passage of the tubular members 15 and 19 clearing the device to receive the end of another piece of wire to be stripped. The device may be provided with a mechanical or air operated means for ejecting the stripped piece of wire from the passages of the tubular portions 15 and 19.

While I have illustrated and described the preferred embodiment of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent, is:

1. A wire stripping machine, comprising a bracket having spaced arms, a driving plate rotatively mounted on one of said arms and having a coaxial passage and a plurality of spiral-like cam slots, a driven plate rotatively mounted on the other of said arms coaxially of said driving plate and having a coaxial passage, a plurality of cutting blades radially slidably mounted on said driven plate and provided with pins engaging said cam slots, a stop plate having portions overlying said slots and adjustably mounted on said driving plate for cutting off portions of said cam slots, said pins engaging said overlying portions of said stop plate, means connected with said driven plate for locking it temporarily so that a force is required to turn said driven plate, an adjustable stop for controlling the extent to which a wire to be stripped may be inserted into said passages, and means for turning said driving plate in one direction and then back.

2. A wire stripping machine, comprising a bracket having spaced arms, a driving plate rotatively mounted on one of said arms and having a coaxial passage and a plurality of spiral-like cam slots, a driven plate rotatively mounted on the other of said arms coaxially of said driving plate and having a coaxial passage, a plurality of cutting blades radially slidably mounted on said driven plate and provided with pins engaging said cam slots, a stop plate having portions overlying said slots and adjustably mounted on said driving plate for cutting off portions of said cam slots, said pins engaging said overlying portions of said stop plate, means connected with said driven plate for locking it temporarily so that a force is required to turn said driven plate, an adjustable stop for controlling the extent to which a wire to be stripped may be inserted into said passages, and means for turning said driving plate in one direction and then back, said radial slidably mounting of said cutting blade being characterized by said pins being slidably engaged through complementary radial slots formed in said driven plate.

3. A wire stripping machine, comprising a bracket having spaced arms, a driving plate rotatively mounted on one of said arms and having a coaxial passage and a plurality of spiral-like cam slots, a driven plate rotatively mounted on the other of said arms coaxially of said driving plate and having a coaxial passage, a plurality of cutting blades radially slidably mounted on said driven plate and provided with pins engaging said cam slots, a stop plate having portions overlying said slots and adjustably mounted on said driving plate for cutting off portions of said cam slots, said pins engaging said overlying portions of said stop plate, means connected with said driven plate for locking it temporarily so that a force is required to turn said driven plate, an adjustable stop for controlling the extent to which a wire to be stripped may be inserted into said passages, and means for turning said driving plate in one direction and then back, said stop plate being formed with radial projecting portions one for each of said cam slots.

4. A wire stripping machine, comprising a bracket having spaced arms, a driving plate rotatively mounted on one of said arms and having a coaxial passage and a plurality of spiral-like cam slots, a driven plate rotatively mounted on the other of said arms coaxially of said driving plate and having a coaxial passage, a plurality of cutting blades radially slidably mounted on said driven plate and provided with pins engaging said cam slots, a stop plate having portions overlying said slots and adjustably mounted on said driving plate for cutting off portions of said cam slots, said pins engaging said overlying portions of said stop plate, means connected with said driven plate for locking it temporarily so that a force is required to turn said driven plate, an adjustable stop for controlling the extent to which a wire to be stripped may be inserted into said passages, and means for turning said driving plate in one direction and then back, and a screw passing through an arcuate slot formed in a portion of said stop blade and threadedly engaging a complementary opening in said driving plate and comprising the means for adjustably holding said stop plate.

5. A wire stripping machine, comprising a bracket having spaced arms, a driving plate rotatively mounted on one of said arms and having a coaxial passage and a plurality of spiral-like cam slots, a driven plate rotatively mounted on the other of said arms coaxially of said driving plate and having a coaxial passage, a plurality of cutting blades radially slidably mounted on said driven plate and provided with pins engaging said cam slots, a stop plate having portions overlying said slots and adjustably mounted on said driving plate for cutting off portions of said cam slots, said pins engaging said overlying portions of said stop plate, means connected with said driven plate for locking it temporarily so that a force is required to turn said driven plate, an adjustable stop for controlling the extent to which a wire to be stripped may be inserted into said passages, and means for turning said driving plate in one direction and then back, said tension means comprising a gear rotatively supported on a pivotally mounted arm, gear teeth formed on the periphery of said driving plate and engaged by said gear and resilient means pivoting said arm to cause said gear to frictionally grip said gear teeth.

6. A wire stripping machine, comprising a bracket having spaced arms, a driving plate rotatively mounted on one of said arms and having a coaxial passage and a plurality of spiral-like cam slots, a driven plate rotatively mounted on the other of said arms coaxially of said driving plate and having a coaxial passage, a plurality of cutting blades radially slidably mounted on said driven plate and provided with pins engaging said cam slots, a stop plate having portions overlying said slots and adjustably mounted on said driving plate for cutting off portions of said cam slots, said pins engaging said overlying portions of said stop plate, means connected with said driven plate for locking it temporarily so that a force is required to turn said driven plate, an adjustable stop for controlling the extent to which a wire to be stripped may be inserted into said passages, and means for turning said driving plate in one direction and then back, said adjusted stop comprising a rotatively supported screw extended into one end of said passage to be engaged by the end of said wire.

7. A wire stripping machine, comprising a bracket having spaced arms, a driving plate rotatively mounted on one of said arms and having a coaxial passage and a plurality of spiral-like cam slots, a driven plate rotatively mounted on the other of said arms coaxially of said driving plate and having a coaxial passage, a plurality of cutting blades radially slidably mounted on said driven plate and provided with pins engaging said cam slots, a stop plate having portions overlying said slots and adjustably mounted on said driving plate for cutting off portions of said cam slots, said pins engaging said overlying portions of said stop plate, means connected with said driven plate for locking it temporarily so that a force is required to turn said driven plate, an adjustable stop for controlling the extent to which a wire to be stripped may be inserted into said passages, and means for turning said driving plate in one direction and then back, said latter mentioned means being foot operated.

REUBEN GORDON.